United States Patent [19]

Fiedrich

[11] Patent Number: 5,209,401
[45] Date of Patent: May 11, 1993

[54] HYDRONIC HEATING WATER TEMPERATURE CONTROL VALVE

[76] Inventor: Joachim Fiedrich, 20 Red Pine Dr., Carlisle, Mass. 01741

[21] Appl. No.: 807,457

[22] Filed: Dec. 13, 1991

[51] Int. Cl.⁵ .................................................. F24D 3/00
[52] U.S. Cl. ...................................... 237/8 C; 137/872
[58] Field of Search ............... 237/8 C; 137/872, 878, 137/116

[56] References Cited

U.S. PATENT DOCUMENTS

| | | | |
|---|---|---|---|
| 2,211,573 | 8/1940 | McGrath | 237/8 C X |
| 2,404,597 | 7/1946 | McClain | 237/8 C X |
| 2,781,174 | 2/1957 | Smith | 237/8 C X |
| 3,742,722 | 7/1973 | Leimbach | 62/225 |
| 3,770,197 | 11/1973 | Meier | 237/8 C |

*Primary Examiner*—William E. Tapolcai
*Attorney, Agent, or Firm*—Robert T. Dunn

[57] ABSTRACT

In a three-way, variable position, automatically controlled diverting valve that is provided in the return line to the boiler of a hydronic heating system between the heating loop return and the boiler return, the valve having its input from the heating loop return, its through output to the boiler return and its diverted output to the heating loop supply, so that the valve diverts some of the cooler return water to the boiler hot supply water, diluting the supply water to reduce the temperature of supply water that feeds the heating loop, a method and means of adapting the diverting valve so that the valve cannot be positioned so that the diverted water flow therefrom is closed, including a stop plug inserted into a housing of the valve that reduces the range of said variable positioning.

14 Claims, 4 Drawing Sheets

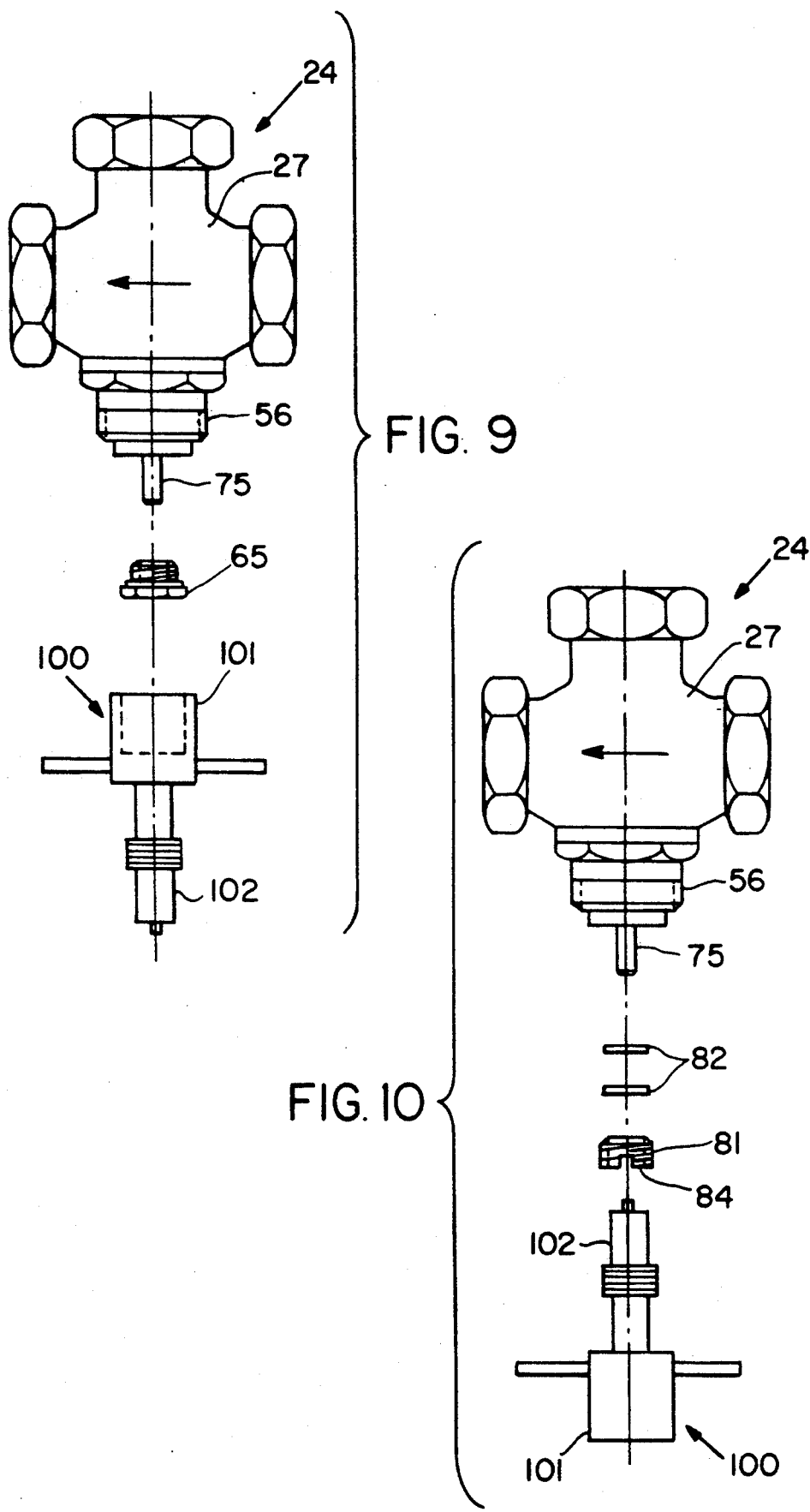

HYDRONIC HEATING WATER TEMPERATURE CONTROL VALVE

BACKGROUND OF THE INVENTION

This invention relates to hydronic heating systems for dwellings, offices, etc. and more particularly to such a system including a diverting valve in the system boiler water return line, adapted and operated to feed some of the system return water flow to the system boiler supply water flow so as to maintain the temperature of the supply water flow to the system heating loops within a predetermined range.

Hydronic heating systems for heating the rooms in a dwelling, office, etc, are used widely in Europe and to a lesser extent in the United States. Water heated in a boiler is distributed to heating loops of tubing in the dwelling that carry the heat by radiation, conduction and convection to the rooms in the dwelling. A common technique provides a boiler hot water supply feeding the supply header of the heating loops and the boiler water return to which the return header of the heating loops connects. The return water is heated in the boiler and sent out again as hot supply water, and so the water is cycled through the essentially closed system. One or more water pumps in this system keep the water flowing and valves control water flow rates through the loops depending on demand.

A heating loop may include several heating elements like wall mounted radiators and/or baseboard finned tubing that are the principal heat exchangers of the loop, or the tubing itself may be the principal heat exchanger of the loop. In the latter case the tubing is usually buried in the floor of a room and the tubing heats the floor. Often the tubing is buried in a special concrete and so heat exchange is principally by conduction and radiation to the concrete, which in turn heats the room by some conduction and convection, but principally by radiation. Hence, this type of heating is called Radiant Floor Heating (RFH). Similarly, the tubing is sometimes mounted in a wall against the material or panels that form the exposed surface of the wall and this type of heating is called Radiant Wall Heating (RWH).

In such RFH and RWA systems and other hydronic heating systems using wall radiators and/or baseboard finned tubing elements, the supply water temperature from the boiler must be controlled so that it does not exceed certain limits that are substantially lower than the usual boiler supply water temperature. There are several reasons for this: first, the temperature of radiator elements on the wall must not be so high that they are not safe to touch; second, for RFH and RWH the temperature of the floor or the wall must not be uncomfortable hot; and third, where the tubing is plastic, the water temperature for some plastic materials must not exceed about 140° F. Good quality "cross-linked" polyethylene tubing, on the other hand, can carry water at temperature in excess of 140° F. without any deterioration of the tubing or the tubing oxygen barrier.

The heating loop supply water temperature could be maintained low and so avoid these problems by simply operating the boiler at a lower water temperature. However, that can cause flue gas condensation on the boiler water heat exchanger. For example, the flue gas due point can be as high as 140° F. and so to avoid flue gas condensation it is preferred that the boiler supply water temperature be not less than 140° F.

In hydronic heating systems subject to such water temperature limitations, where the boiler is powered by burning fossil fuels, the boiler water supply temperature is usually well above 140° F. and often at about 190° F. to 200° F., and so the boiler supply temperature must be stepped down before it is fed to the heating loops. In the past, a three-way, electrically controlled, motorized mixing valve has been used in the boiler supply line that feeds the supply header for the heating loops, between the boiler supply and the heating loops supply header. This mixing valve has two inputs and one output. One input is directly from the boiler hot water supply, the other input is from the return header of the heating loops and the output is directly to the supply header of the heating loops. The mixing valve motor is electrically energized by remote reset controls that sometimes respond to outside ambient temperature, inside room temperature, boiler water temperature, supply header water temperature, etc. In operation, the mixing valve mixes some return water with the hot supply water to reduce the temperature of the supply water that is fed to the supply header of the heating loops. Such prior systems perform quite satisfactorily, but they are relatively expensive, require remote transducers and electric power to the valve's motor and relatively greater skill to install and adjust for efficient operation.

In an effort to reduce expense, non-motorized mixing valves have been used in the boiler supply line. These have the disadvantage of providing less comfort and lower long term fuel economy. However, for the small installation (kitchen-bath additions, etc. to a dwelling), where it is difficult to justify the cost of a more sophisticated motorized valve and its controls, these systems are sometimes used. They usually have a remote electrically operated room thermostat controlling a circulator wired through a surface aquastat to prevent overheated water from entering the heating loops; and on the boiler supply line is a dial thermometer that indicates the supply water temperature into the loop supply header. However, manually setting the water temperature into the heating loops by adjusting the valve setting is not precise. Often within a few hours after start-up, when temperatures throughout the system have stabilized, fluctuations of the boiler supply water temperature, or varying load conditions at other parts of the system will cause excessive fluctuations of water temperature delivered by the valve to the heating loops supply header. These systems have no feedback control to the mixing valve that is derived from the heating loop supply header water temperature.

An improved system using a three-way diverting valve in the system return line is described in co-pending U.S. patent application Ser. No. 545,339, filed Jun. 28, 1990 by the inventor herein and entitled "Hydronic Heating Water Temperature Control System. In that patent application a three-way, modulated diverting or by-pass valve is provided in the return line to the boiler, between the heating loop return header and the boiler return. The diverting valve has one input and two outputs. The input is from the heating loops return header, the first output is to the boiler return line and the second output is to the boiler supply line. The diverting valve diverts some of the cooler return water to the hot supply water to reduce the temperature of the supply water feeding the heating loop supply header. Thus, the supply water is diluted with return water, lowering the temperature of the supply water directly from the boiler. The diverting valve is a modulated valve and the temperature of the supply water flowing to the supply header is detected and used as a feedback control signal to modulate the valve.

In that system, it is preferred that the water pump be in the return line between the return header and the diverting valve input, so that the diverting valve input is at the high pressure side of the pump. However, the water pump can, instead, be located between the bypass tee connector in the supply line and the heating loop supply header.

This use of a diverting valve in the return line with the feedback control affords a technique of "Set Point Control". The three-way diverting valve in the return line with its control, including temperature feedback from the heating loops supply header, provides automatic water tempering, insuring constant supply water temperature to the heating loops. It may be relatively inexpensive and reliable and can be the primary entry-level controller in a hydronic heating system in a dwelling, office, etc. High quality three-way modulated diverting valves are available from a number of sources.

The feedback control (set point control) of the diverting valve can be provided by remote electric transducers and a motor driving (modulating) the diverting valve. Feedback control can also be provided by a non-electric thermostatic actuator head that engages the diverting valve stem and is controlled by a capillary temperature sensor. In both cases, the feedback control derived from the temperature of the diluted (tempered) supply water that is fed to the heating loops header can be the primary valve modulation control.

A typical three-way diverting valve such as shown in said co-pending U.S. patent application Ser. No. 545,339 is a conventional three-way diverting valve. It has one input and two outputs; the through output is to the return line to the boiler; the diverted output is to the boiler supply line; it has a spring loaded valve stem that carries two plugs, one to close the through output and the other to close the diverted output; and a spring that urges the stem to move in the direction that closes the diverted output and opens the through output. Thus, in view of the intrinsic operation of any control head, whether it is electric, thermostatic or otherwise, the control head piston engages the valve stem only to push the stem in and so increase diverted water flow when the thermostat control head setting calls for less heat or a lower temperature of the heating loop header water temperature. If the head is set too high, or does not work, or is removed from the valve, the diverted output closes and the supply water to the heating loops is not diluted and may be too hot for comfort of cause other undesirable effects mentioned herein.

As mentioned above, any type of electric or thermostatic control head attached to the diverting valve as described herein, is such that the control head piston engages the valve stem only to push the stem in and so increase diverted water flow when the control head setting (set electrically or mechanically) calls for less heat or a lower temperature of supply water to the supply header than the actual temperature of supply water to the supply header (actual heat). The actual temperature of supply water to the supply header is referred to herein as the control water temperature and if that temperature is below what the head setting calls for, the head piston does not engage the valve stem at all and so the valve spring moves the stem to close the diverted output and open the through output.

Thus, this valve control actuation produces: maximum flow of diverted return water to the supply line when the control water temperature is substantially greater than the control head setting; a variable modulated flow of diverted return water to the supply line when the control water temperature and the control head setting are about the same (equivalent); and zero diverted water flow when the control water temperature is substantially less than the control head setting. Here, even when the head is functioning properly, a situation can arise when there is no diverted water flow, and so the header for the heating loops is fed undiluted boiler supply water, which is often too hot for efficient delivery of heat and too hot for comfort. As mentioned above, the same problem arises if the control head is removed from the valve, in which case the valve spring also completely closes the diverted water output and the header for the heating loops is fed undiluted boiler supply water making: radiator elements on the wall too hot to touch; RFH floor and RWH wall temperatures uncomfortable hot; and in heating loops using plastic tubing, the water temperature would be in excess of the recommended temperature and could cause deterioration of the tubing or the tubing oxygen barrier.

SUMMARY OF THE INVENTION

It is an object of the present invention to provide a hydronic heating system that is relatively less expensive than prior systems of equivalent capacity and which avoids some if the limitations and disadvantages of the prior systems.

It is another object to provide a hydronic heating system with boiler supply water temperature control that is satisfactory to avoid feeding excessively high temperature boiler supply water to the system heating loops.

It is another object to provide a hydronic heating system with boiler supply water temperature control that is satisfactory to avoid feeding excessively high temperature boiler supply water to the system heating loop plastic tubing.

It is another object to provide a hydronic heating system with boiler supply water temperature control that is satisfactory to avoid feeding excessively high temperature boiler supply water to the system heating loop cross-linked polyethylene plastic tubing.

It is another object to provide a hydronic heating system with boiler supply water temperature control that is satisfactory to avoid feeding excessively high temperature boiler supply water to the system RFH and/or RWH loops.

It is another object to provide a hydronic heating system with boiler supply water temperature control that is satisfactory to avoid feeding excessively high temperature boiler supply water to the system radiators.

It is another object to provide a hydronic heating system with boiler supply water temperature control that is satisfactory to avoid feeding excessively high temperature boiler supply water to the system finned tubing heating elements.

It is a particular object of the present invention to provide a hydronic heating system with boiler supply water temperature control accomplished by feeding return water into the boiler supply line to reduce the boiler supply water temperature using a relatively simple non-motorized mixing valve in the boiler supply line with non-electric thermostatic controls.

It is another object to provide a hydronic heating system with boiler supply water temperature control that is satisfactory to avoid feeding excessively high temperature boiler supply water to the system heating loops and yet avoid operating the boiler at a water temperature that is likely to cause flue gas condensation in the boiler.

According to the present invention a conventional diverting valve is changed or adapted by installing a mechanism in the valve that insures that the diverted output of the valve cannot be less than a determinable part of the total flow through the valve. Having determined that minimum part and set the installed mechanism accordingly, the supply water temperature in the header feeding the heating loops is limited and so will not be too hot for efficient delivery of heat or too hot for comfort, regardless of the action of the control head, or even if the control head is removed from the valve In other words, this mechanism insures that the temperature of the water flowing to the header for the heating loops is always less than the boiler supply water temperature.

DESCRIPTION OF THE DRAWINGS

FIGS. 9 and 10 show exploded views of the valve and the high temperature limit stop and a tool for removing the valve conventional dust cap and inserting and adjusting the high temperature limit stop, thereby adapting the diverting valve.

DESCRIPTIONS OF AN EMBODIMENT OF THE INVENTION

The present inventions provide means for limiting the temperature of the supply water of a hydronic heating system where the water is heated in a boiler powered by burning a fuel.

The reasons for limiting the temperature are several and depend upon the kind of tubing and/or heat exchanger elements that are used in the system heating loops. As mentioned above, some elements are exposed to the occupants of the dwelling and so they must not be so hot that they are not safe to touch. Where RFH or RWH is used, the floor or wall temperature must not be uncomfortable hot and where plastic tubing is used the water temperature must be limited so as not to cause early failure of the tubing. Hence, the temperature of the supply water fed to the heating loops is controlled in view of the kind of materials used and in view of the kind of elements used in the heating loops. In a given installation, there may be more than one different kind of element and more than one different kind of material used in the heating loops, all fed from the same boiler. For this reason the improvements of the present invention enable ready, reliable, in situs adjustment to insure that supply water temperature does not exceed the limitations of the elements and/or materials of each of the heating loops of the system.

Figure 1:
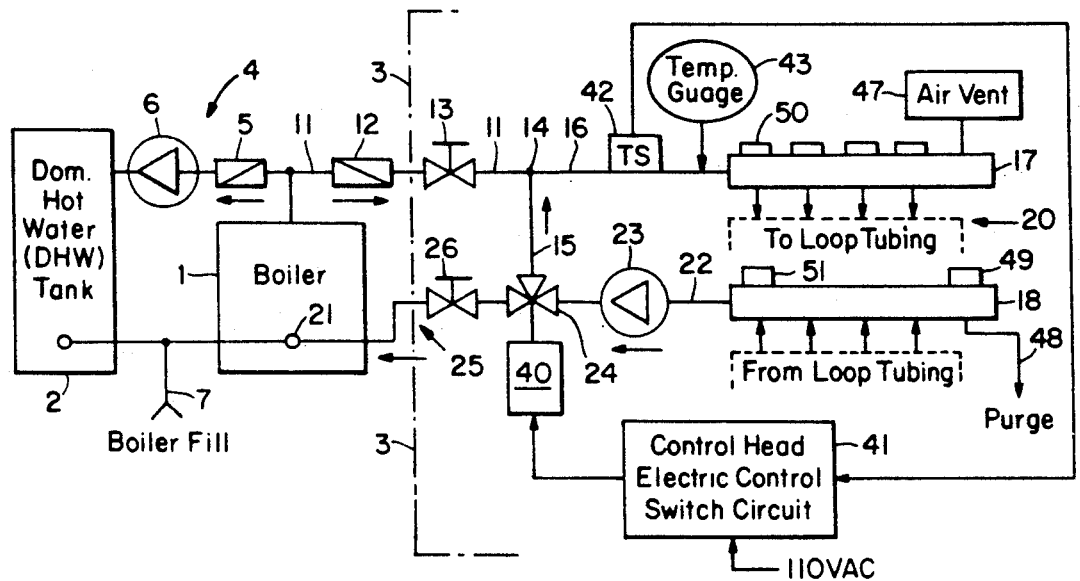
FIG. 1 is a schematic diagram of a hydronic heating system with a diverting valve having a high temperature limit stop according to the present invention, in the return line of the system and a conventional electric control head on the valve.
Figure 2:
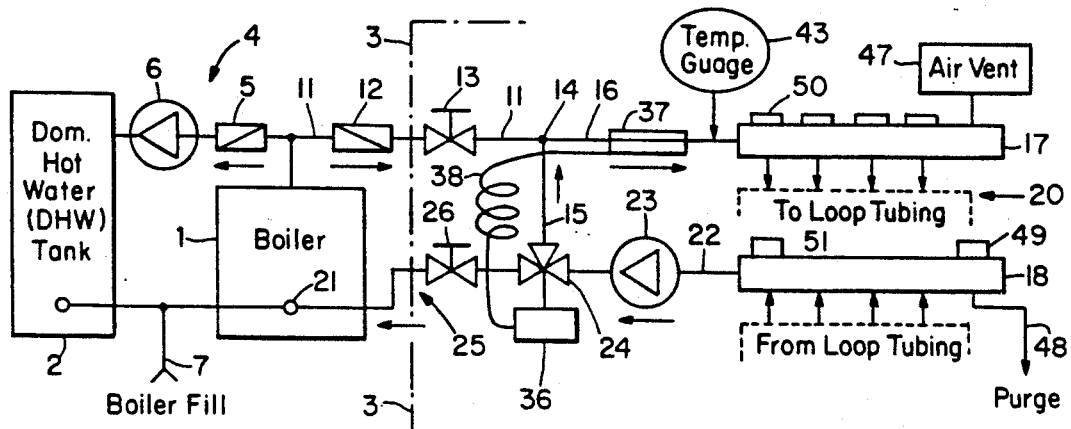
FIG. 2 is a schematic diagram of a hydronic heating system with a diverting valve having a high temperature limit stop according to the present invention, in the return line of the system and a conventional non-electric thermostat control head on the valve.
Figure 6:
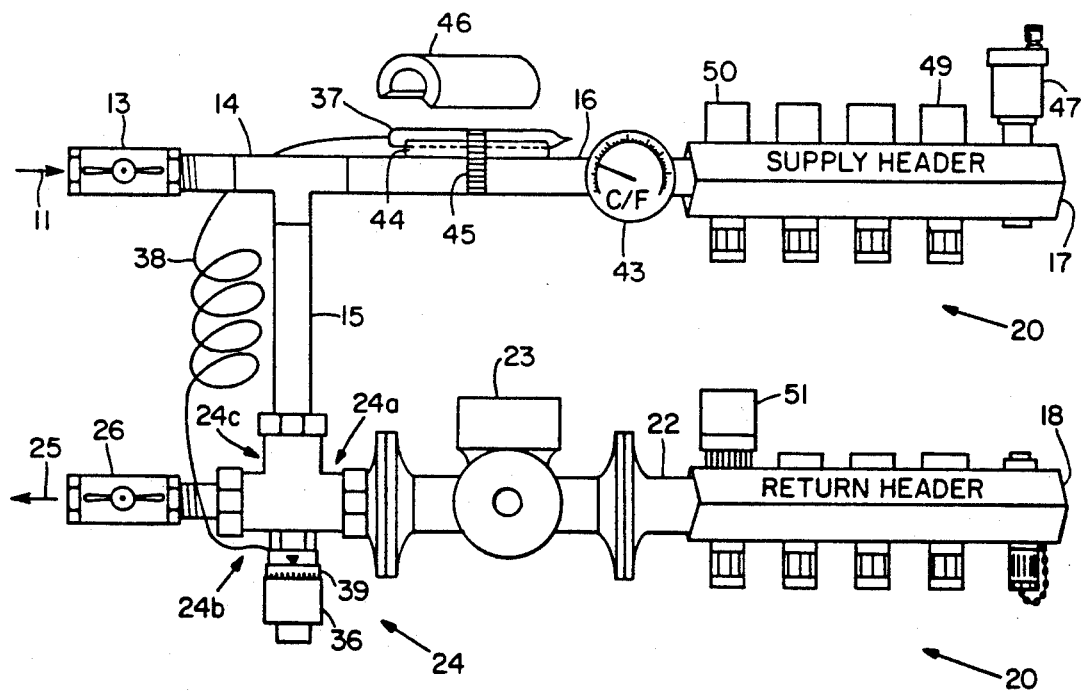
FIG. 6 is a front or elevation view of the piping configuration of the distribution station of a hydronic heating system with a diverting valve having a high temperature limit stop of the present invention, in the return line of the system.

Diverting Valve In Return Line With Diluted Supply Water Temperature Feedback Control Turning first to FIGS. 1, 2 and 6, FIGS. 1 and 2 are schematic diagrams of a typical hydronic heating system installed in a dwelling having a diverting valve in the system return water line, that incorporates the improvement (a high temperature limit stop) of the present invention. FIG. 6 is a detailed elevation view of the distribution station of the hydronic system. The system shown here in FIGS. 1, 2 and 6 is essentially the same as shown and described in the above mentioned co-pending U.S. patent application Ser. No. 545,399. It includes a boiler 1 that supplies the hydronic distribution station 3 and also supplies the dwelling domestic hot water (DHW) tank 2. The usual requirement of the system is to provide DHW water at about 160° F. to 180° F., which is the usual hot water temperature requirement for washing machines and dish washers. The same boiler supply also feeds the hydronic heating system 3. As shown in these Figures, the hydronic heating system distribution station 3 includes four heating loops 20, of which one or more require that the supply water temperature be substantially lower than 180° F. and so for those loops, return water is diverted to the loop supply, diluting the loop supply and so reducing the temperature (tempering) the loop supply water to within the required limits.

FIGS. 1, 2 and 6 show details of the distribution station 3 incorporating a three-way modulated diverting valve in the return line. The boiler supply line 11 to the station includes a unidirectional check valve 12, an isolation ball valve 13, a T connection 14 to diverting line 15 and the continuation 16 of supply line 11 to heating loop supply header 17 that feeds the several (four) heating loops 20. A separate loop tubing connection to the supply header 17 is provided for each loop. At the other end of each loop a similar tubing connection is provided to the return header 18. The return line from header 18 to the boiler return reservoir 21 includes a first section 22 to water pump 23, three-way modulated diverting valve 24, that has incorporated therein a high temperature limit stop according to the present invention, boiler return line 25 and isolation ball valve 26 in the return line.

Figure 7:
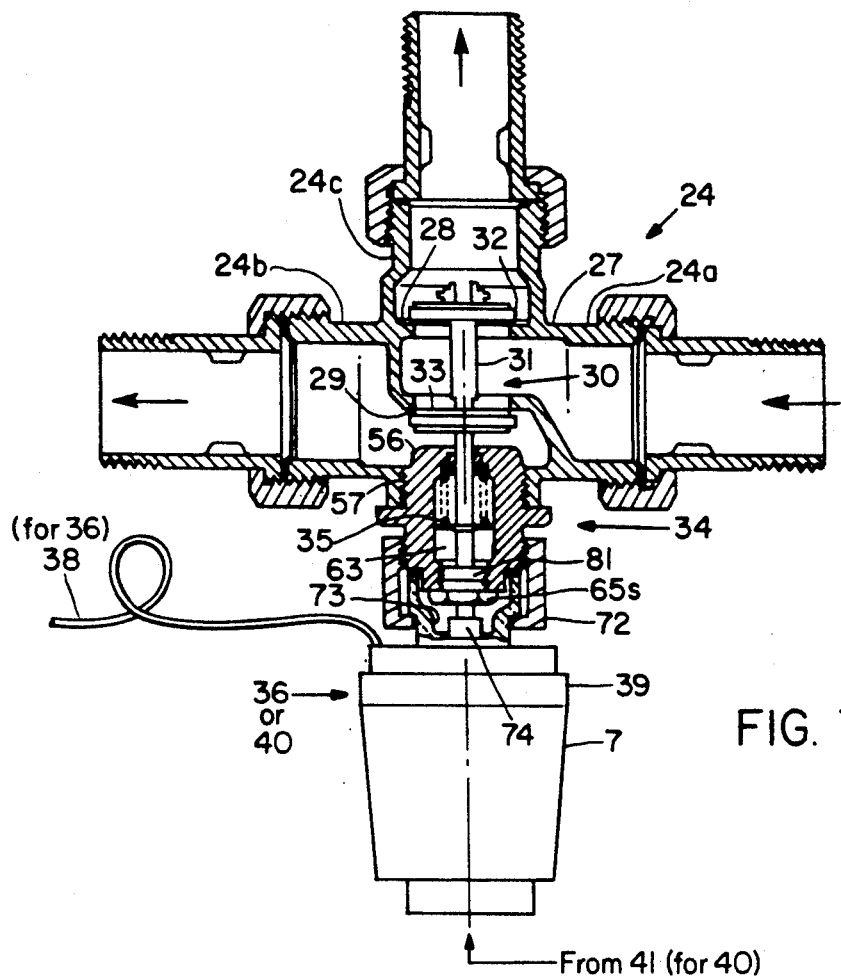
FIG. 7 is a cross section view of a typical conventional three-way, modulated diverting valve adapted with a high temperature limit stop according to the present invention, with an electric or a non-electric thermostat control head attached thereto and showing, as an example, the valve position equivalent to the position shown in FIG. 4.

Three-way modulated diverting valve 24 has one water flow input 24a from pump 23, receiving return water from the heating loops, a first water flow output 24b to the boiler return line 25 and a second water flow output 24c to diverting line 15 that connects to the supply line T connection 14. A suitable structure of diverting valve 24 is shown in FIG. 7. The valve includes a housing 27 defining the input and two outputs, a diverting flow seat 28 and a return flow seat 29. The valve spindle assembly 30 includes the stem 31, carrying the diverting flow disc 32 and the return flow disc 33 adapted to close against the seats 28 and 29, respectively. The stem is carried by the stem gland assembly 34 that fits tightly to the housing and is sealed thereto, the stem being slideably carried by the gland assembly and the stem is spring loaded by coil spring 35 in the assembly, which urges the stem to move in a direction that closes the diverting water passage 24c and opens the return water passage 24b.

Modulation of valve 24 is accomplished by moving the stem 31 against spring 35 and is done by delivering a force to the stem to overcome the spring resistance. An electric or non-electric thermostatic control head delivers this modulating force to the valve stem.

In FIG. 1, the electric control head 40 includes an electric motor or actuator that is energized by 24 VAC from control switch circuit 41. One of the electric signal inputs to switch circuits 41 is from temperature sensor 42 that is attached to supply line 16 and so the temperature detected by the sensor is essentially the temperature of the diluted supply water flowing into the supply header 17.

FIG. 2 shows the same hydronic heating system in which diverting valve has a non-electric, thermostat control head 36, a thermal sensor bulb 37 and a capillary line 38 from the sensor bulb to the head. The sensor bulb and capillary contain a fluid that expands as the fluid temperature increases, delivering an increased pressure force via the capillary to the head, which converts the fluid pressure to a mechanical force against the stem. Thus, when the temperature of the fluid in the sensor bulb increases, the force on the stem increases, increasing the diverted water flow. In this way, the temperature of the diluted supply water flowing to the loops supply header 17 is effective as a feedback control signal to modulate the valve.

A visible temperature gauge 43 is also attached to line 16 close to header 17 in intimate thermal contact with the line so that it displays a temperature as near to the temperature of the tempered supply water as possible.

Figure 8:
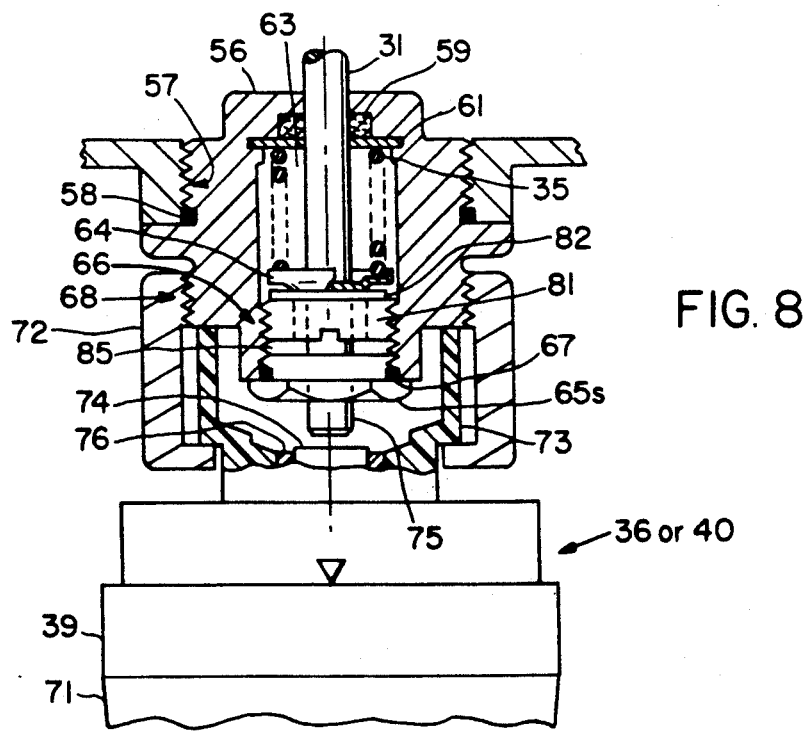
FIG. 8 is an enlarged view of part of the valve showing the adaptation of the valve with a high temperature limit stop according to the present invention.

Diverting valve 24, as shown in FIGS. 7 and 8, has a gland assembly 34 that includes the gland housing 56 that screws into the valve housing 27 by threads 57 and the two housings are sealed against water pressure by O ring seal 58. The stem is slideably held by the gland assembly and sealed thereto by water tight seal 59 held in place by retainer ring 61. Spring 35 is held in housing 56 in space 63 and at one end bears against retainer ring 61 fixed to the housing and at the other end bears against the stem ring 64, which is fixed to the stem. The external open end of the gland housing is closed by hex head dust plug 65 that screws into the open end of the housing by threads 66 and may carry an O ring 67 sealing against the housing. In the conventional valve, hex head dust plug 65 screws tight to the gland housing and serves no other purpose than to slideably pass the stem to outside the valve and close the inside of the housing containing the spring against outside moisture and dirt. There is no water pressure in the space 63 inside the gland housing.

On the outside of the gland housing 56 are threads 68 for attaching the electric control head 40 or the non-electric thermostatic control head 36. As shown in FIG. 7, either control head is attached by head holding nut 72 by screwing the nut onto threads 68. The nut is captured by the control head positioning boss 73 that abuts the gland housing when nut 72 is tightened to fix the position of the control head piston 74 relative to the end 75 of the stem that projects from plug 65 and the piston is guided by sleeve 76 centrally located in the boss 73.

A suitable three-way diverting valve for use in this system is manufactured by F. W. Overtrop KG, of Olsberg, West Germany and is designated three-way valve PN10.

Electric Control Head Operation

Electric control head 40, shown in FIG. 1, contains an electric motor or an electric actuator that is controlled energized by 24 VAC electric power from control switch circuit 41. It has a piston that drives into and out of the diverting valve 24 against the valve stem 31 and so positions (opens and closes) the valve. A suitable electric control head for controlling such a three-way diverting valve is also manufactured by Overtrop and called an electrothermal actuator operating at 24 VAC. Thus, the electric control head may contain a two position electric actuator or a reversible electric motor and so may be fully modulating. The type used depends on the system control strategy.

Non-Electric Thermostatic Control Head Operation

In FIGS. 2 and 6, sensor bulb 37 is preferably located so as to detect the temperature of the supply water flow into header 17 that feeds the heating loops. This can be done simply by attaching the sensor bulb in intimate thermal contact with the outside of supply line 16 as shown in FIG. 6. For this purpose, the elongated sensor bulb 37 is oriented longitudinally along line 16, partially enclosed by mounting block 44 that also partially encloses line 16 and is secured tightly thereto by strap 45. The block is made of highly thermally conductive material such as copper or aluminum, to insure that the temperature of the fluid in the bulb is substantially the same as the temperature of the tempered supply water flowing in line 16 immediately adjacent thereto. Also, this assembly may be covered with an insulating sleeve 46 to insure the equality of temperature.

A suitable thermostatic valve-control head, sensor bulb and capillary for controlling such a three-way diverting valve is also manufactured by Overtrop and called a temperature controller. On the outside of control head 36 is the control head heat setting ring 39 which is rotated relative to the body of the head to set temperature or heat called for by the system.

An initial adjustment of the system in FIGS. 2 and 6 (with thermostatic control head 36), when operation first commences can be carried out as follows: (a) with supply water flowing to one or more of the heating loops, observe the temperature indication of temperature gauge 43; (b) if the temperature indicated by the gauge is too high, rotate manual adjusting ring 39 of control head 36, decreasing the index number in line with the marker thereon, thereby increasing the force that the head exerts on the valve stem spring for the then prevailing bulb fluid pressure, and so diverted return water flow via line 15 to supply line 16 is increased reducing the temperature of the water in the header; (c) on the other hand, if the temperature gauge 43 reads too low, rotate ring 39 to increase the indicated number so that less return water is diverted to the supply line and the temperature of the supply water flow to header 17 increases. These adjustments are made until the system operates steadily at the supply water temperature desired as indicated by temperature water gauge 43. At that point, the system is, in effect, calibrated for automatic feedback operation to deliver tempered (diluted) supply water to header 17 at the desired temperature even though various heating loops are turned on and off, depending upon demand, and the boiler supply water temperature fluctuates up and down, again, depending upon demand. This is a modulating, non-electric water dilution control.

For added safety and ease of maintenance, the supply header 17 may be equipped with an air vent 47 and the return header may be equipped with a purge line 48 controlled by a manually operated valve 49. Supply water flow to each of the heating loops may be controlled by a balancing valve with an internal position set screw. Such balancing valves for each loop are denoted 50. An alternate control for each loop could be an electrically operated power head like 51 (see FIG. 6), each controlled by an electrical thermostat in the dwelling.

Valve Adaptation—Mechanical Stop of Present Invention

Figures 3, 4, 5:
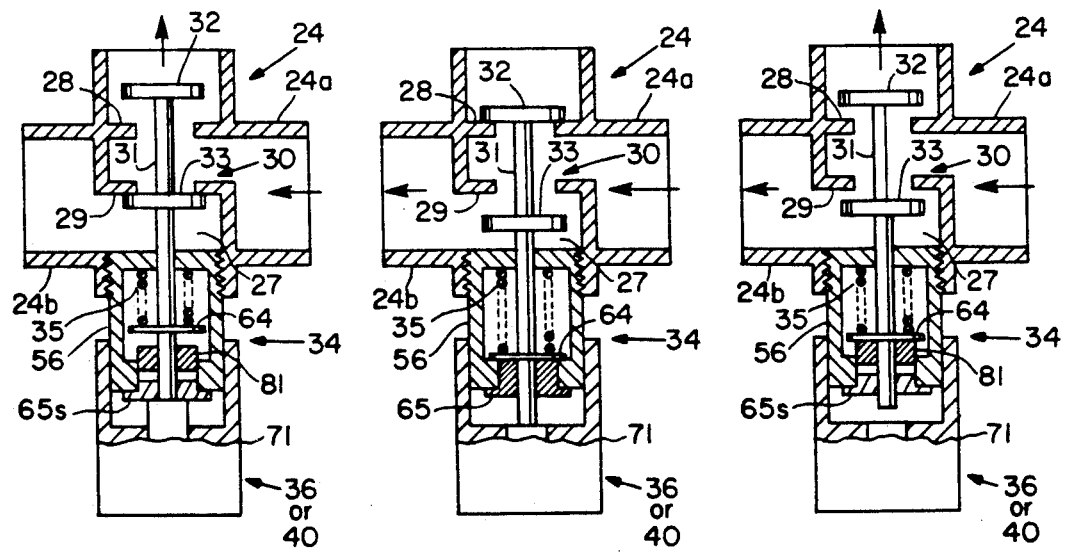
FIGS. 3, 4 and 5 are cross-section diagrams of the diverting valve and thermostat control head to show the operation with and without the high temperature limit stop adapting mechanism of the present invention.

According to embodiments of the present invention, as shown symbolically in FIGS. 3 to 5, the conventional diverting valve 24 equipped with a conventional electric control head 40 or non-electric thermostatic control head 36 in the system shown in FIGS. 1 and 2 is adapted to provide an adjustable stop for the coil spring 35 in the gland assembly 34 so that the spring cannot move the valve position in the direction that closes the diverting output and opens the return output any more than shown by FIG. 4, while permitting the extreme position of fully open diverting output and fully closed return output shown in FIG. 3. Thus, the mechanism insures that the valve cannot be positioned at any position between the position shown in FIG. 4 and the position shown in FIG. 5, where the diverting output is closed. By adapting the conventional diverting valve in this way, it is assured that the temperature of the mixed water flowing to the header for the heating loops is always less than the boiler supply water temperature.

This is done in the present invention by removing the conventional gland assembly dust plug 65 that serves only to provide a mechanical guide for the stem 31 emerging from the gland assembly and seal the spring space 63 therein against outside moisture and dirt. As shown in FIG. 8, the conventional gland assembly dust plug 65 is removed and replaced by a headless stop plug 81 that is screwed into housing plug threads 66 to a depth that positions a spacer ring 82 at the end 83 of the stop plug and is adapted to contact the spring-stem engaging ring 64 so that the spring extension is limited by stop plug 81 and that limit position is adjustable by turning the stop plug driving slot 84 to screw the plug in or out. Then dust plug 65 is screwed into threads 66 to provide again a mechanical guide for stem 31 and seal the spring space against dirt and moisture. For this purpose, the usual dust plug for the valve can be shortened so that there is a space 85 between the dust plug and the stop plug.

Adaptation of Diverting Valve

FIG. 9 shows the conventional diverting valve 24 without a control head attached, the extending end 75 of the stem projecting from the gland housing 56 and the conventional gland housing dust plug 65 removed.

It is removed using the socket 101 of tool 100 that fits the dust plug hex head 65h. Then one or more spacers 86 are inserted onto the protruding end 75 of the stem and as shown in FIG. 10 headless stop plug 81 is screwed into the housing using the screw driver end 102 of tool 100 that fits the plug slot 84. In this process, when the spacers 82 at the end of the plug meet spring retainer 63 there is resistance to further screwing the plug into the housing. When that resistance is felt, the installer then continues to screw stop plug 81, using tool 100, a predetermined number of turns so that the valve is positioned to divert a predetermined portion of the total flow through the valve to the system supply line. That position is represented by FIG. 4.

The adaptation of the diverting valve according to the present invention is completed by screwing in the shortened dust plug 65s to provide a mechanical guide for the valve stem and seal the spring space against outside dirt and moisture. This is done using socket 101 of tool 100 that fits the shortened dust plug hex head.

CONCLUSION

While the invention described herein is described in connection with a preferred embodiment, it will be understood that it is not intended to limit the invention to that embodiment. It is intended to cover all alternatives, modifications, equivalents and variations of those embodiments and their features as may be made by those skilled in the art within the spirit and scope of the invention as defined by the appended claims.

I claim:

1. In a hydronic heating system having a source of hot supply water and a reservoir of cooler return water, a supply water line from said source, a return water line to said reservoir and one or more heating loops through which water flows from said supply line to said return line, a three way diverting valve in said return line for diverting water from said return line to said supply line so that said supply water to said heating loop is diluted with said diverted return water, reducing the temperature thereof, said valve having a stem that positions said valve and a spring that urges said stem toward the valve position of less diverted water flow and a valve controller for controlling the position of said valve stem, said valve stem and spring being contained in a housing from which said valve stem projects to said valve controller through an opening in said housing, the improvement comprising:
   (a) means for limiting the movement of said valve stem in said direction toward the valve position of less diverted water flow including,
   (b) a stop plug that fits into said opening in said housing providing a mechanical block that limits the movement of said valve stem in said direction toward the valve position of less diverted water flow,
   (c) whereby said valve stem cannot be positioned for no diverted water flow.

2. A hydronic heating system as in claim 1 wherein (a) said mechanical block is a projection of said stop plug.

3. A hydronic heating system as in claim 2 wherein (a) said opening in said housing is threaded, said stop plug has matching threads and said stop plug is screwed into said opening.

4. A hydronic heating system as in claim 3 wherein (a) said stop plug is headless so that it can be screwed into said threaded opening leaving opening threads to accommodate screwing a dust plug into said opening on top of said headless stop plug.

5. A hydronic heating system as in claim 1 wherein
(a) said mechanical block includes spacers inserted in said opening before said stop plug.

6. A hydronic heating system as in claim 5 wherein
(a) said opening in said housing is threaded, said stop plug has matching threads and said stop plug is screwed into said opening.

7. A hydronic heating system as in claim 6 wherein
(a) said stop plug is headless so that it can be screwed into said threaded opening leaving opening threads to accommodate screwing a dust plug into said opening on top of said headless stop plug.

8. A hydronic heating system as in claim 1 wherein
(a) said source is a combustion boiler supply,
(b) said reservoir is said boiler water reserve,
(c) a first water flow path is provided from said boiler supply through said supply line, through said heating loops, through said return line and said diverting valve to said boiler reservoir,
(d) means are provided in said system for compelling water to flow through said first water flow path,
(e) said heating loop has a limitation on the temperature of water flowing therethrough and
(f) said loop temperature limitation is substantially lower that the temperature of said supply water from said combustion boiler.

9. A hydronic heating system as in claim 8 wherein
(a) said means for compelling water to flow is a water pump, and
(b) said water pump is in said water flow path between said heating loop and said boiler reservoir.

10. A hydronic heating system as in claim 9 wherein
(a) said water pump is in said water flow path between said heating loop and said valve.

11. A hydronic heating system as in claim 1 wherein:
(a) said valve controller is a non-electric thermostatic controller and includes a bulb temperature sensor, a thermostatic control head attached to said valve and a capillary tube from said bulb to said control head and
(b) said bulb sensor detects diluted supply water temperature.

12. A hydronic heating system as in claim 11 wherein:
(a) a second water flow path is provided from said valve diverted water flow output to said supply line, through said heating loops to said valve water flow input.

13. A hydronic heating system as in claim 12 wherein:
(a) said means for compelling water to flow is a water pump, and
(b) said water pump is in said water flow path between said heating loop and said valve.

14. In a hydronic heating system having a source of hot supply water and a reservoir of cooler return water, a supply water line from said source, a return water line to said reservoir and one or more heating loops through which water flows from said supply line to said return line, a three way diverting valve in said return line for diverting water from said return line to said supply line so that said supply water to said heating loop is diluted with said diverted return water, reducing the temperature thereof, said valve having a stem that positions said valve and a spring that urges said stem toward the valve position of less diverted water flow, a valve controller for controlling the position of said valve stem, said valve stem and spring being contained in a housing from which said valve stem projects to said valve controller through an opening in said housing, in which there is a plug providing a mechanical block that limits the movement of said valve stem, the method of assuring that the temperature of said diluted water is always less than the temperature of said supply water including the step of:
(a) adjusting the position of said plug in said housing opening to limit the movement of said valve stem in said direction toward the valve position of less diverted water flow,
(b) whereby said valve stem cannot be positioned for no diverted water flow.

* * * * *